United States Patent [19]
Carroll, Jr.

[11] Patent Number: 5,255,782
[45] Date of Patent: Oct. 26, 1993

[54] BATTERY TRAY DEVICE

[75] Inventor: Joseph W. Carroll, Jr., West Chester, Pa.

[73] Assignee: Kim Manufacturing Company, Downingtown, Pa.

[21] Appl. No.: 923,253

[22] Filed: Jul. 31, 1992

[51] Int. Cl.⁵ .............................................. B65D 73/02
[52] U.S. Cl. ..................................... 206/333; 220/62; 229/23 R; 229/117.16
[58] Field of Search ................ 206/333; 220/62, 62.1; 229/23 R, 117.16; 429/54, 55; 224/902

[56] References Cited

U.S. PATENT DOCUMENTS

| | | | |
|---|---|---|---|
| D. 68,264 | 9/1925 | Klug | 206/333 |
| 662,801 | 11/1900 | Munford | 220/62 |
| 1,631,658 | 6/1927 | Trefzger | 206/333 |
| 2,027,262 | 1/1936 | Allen | 206/333 |
| 2,053,595 | 9/1936 | Belsinger | 229/23 R |
| 2,162,119 | 6/1939 | Reaume | 229/117.16 |
| 2,191,837 | 2/1940 | Thomas | 206/333 |
| 2,321,536 | 8/1943 | Wells | 229/23 R |
| 2,483,174 | 9/1949 | Belsinger | 229/23 R |
| 2,488,710 | 11/1949 | Cooper | 220/62 |
| 2,717,094 | 9/1955 | Moore | 220/62 |
| 3,146,132 | 8/1964 | Nathan | 206/333 |
| 3,850,362 | 11/1974 | Stollberg et al. | 229/23 R |
| 3,900,157 | 8/1975 | Roth | 229/117.16 |
| 4,497,408 | 2/1985 | Tes | 229/23 R |
| 4,981,254 | 1/1991 | Depper | 229/117.16 |

Primary Examiner—David T. Fidei
Attorney, Agent, or Firm—Eugene E. Renz, Jr.

[57] ABSTRACT

A tray device having a predetermined rectangular shape for holding a battery conforming to the predetermined rectangular shape comprising a front panel, a rear panel and a pair of side panels forming the predetermined rectangular shape. The side panels each have bottom panels folded to form a bottom for the predetermined rectangular shape. The bottom panels also have bottom flanges and the side panels each have side flanges with all of the flanges being folded a right angles to their respective panels to provide parallel contact with the front and rear panels. The side flanges have sufficient space from the bottom flanges to permit location of all of the flanges in one plane of contact with the front and rear panels. The tray is assembled using a plurality of spot welds fixedly attaching the flanges to the front and rear panels without substantially altering the predetermined rectangular shape.

14 Claims, 3 Drawing Sheets

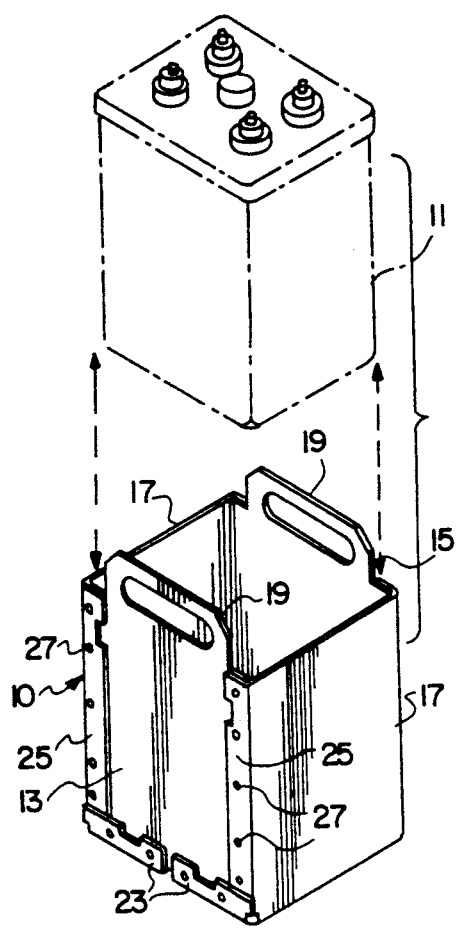
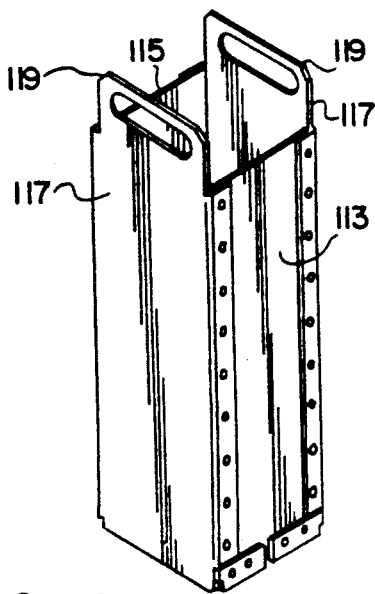
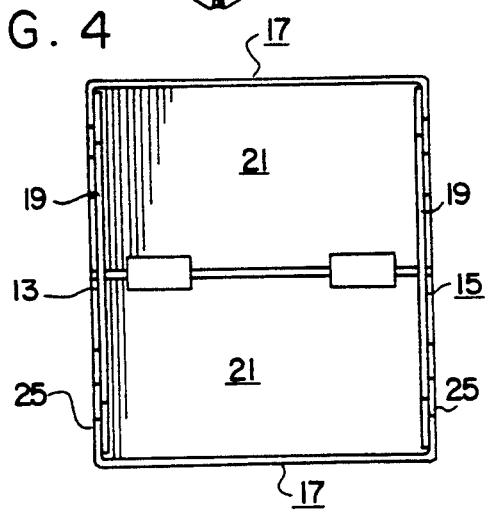
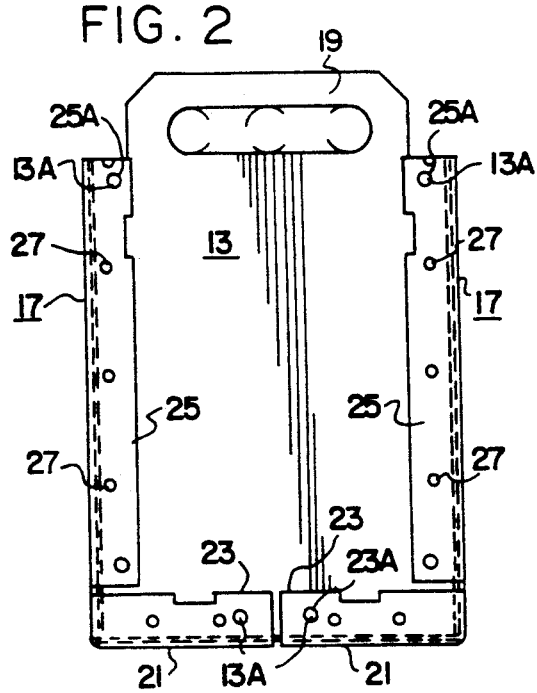
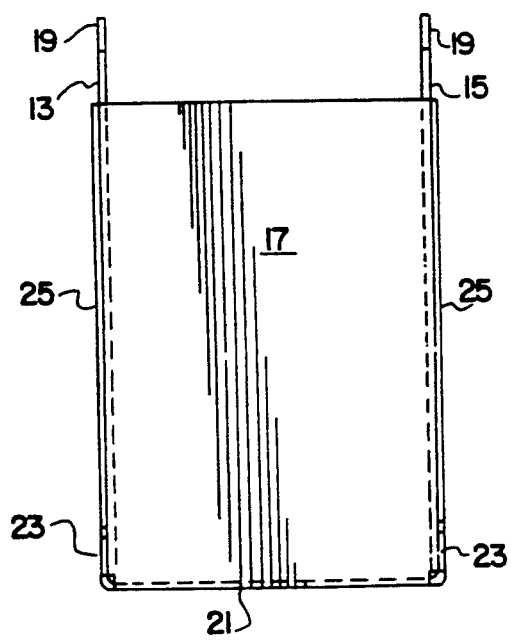

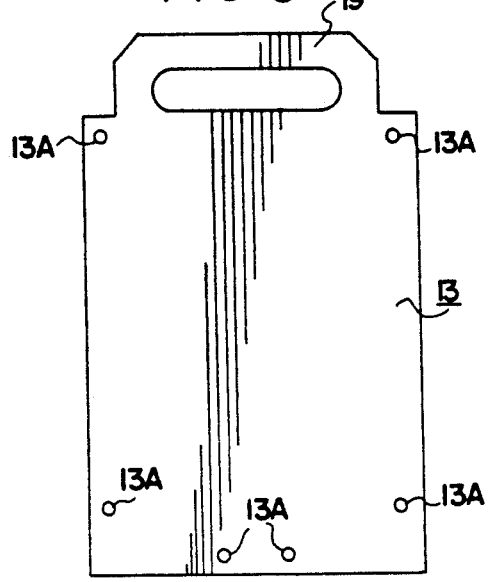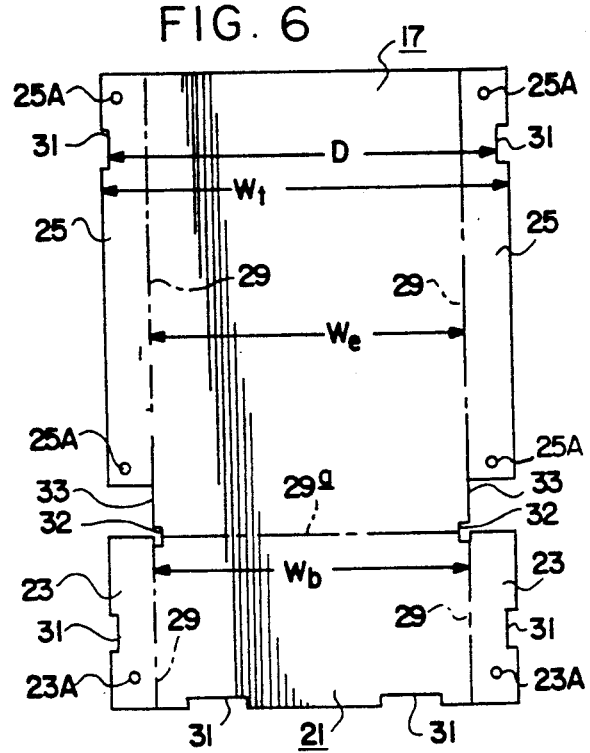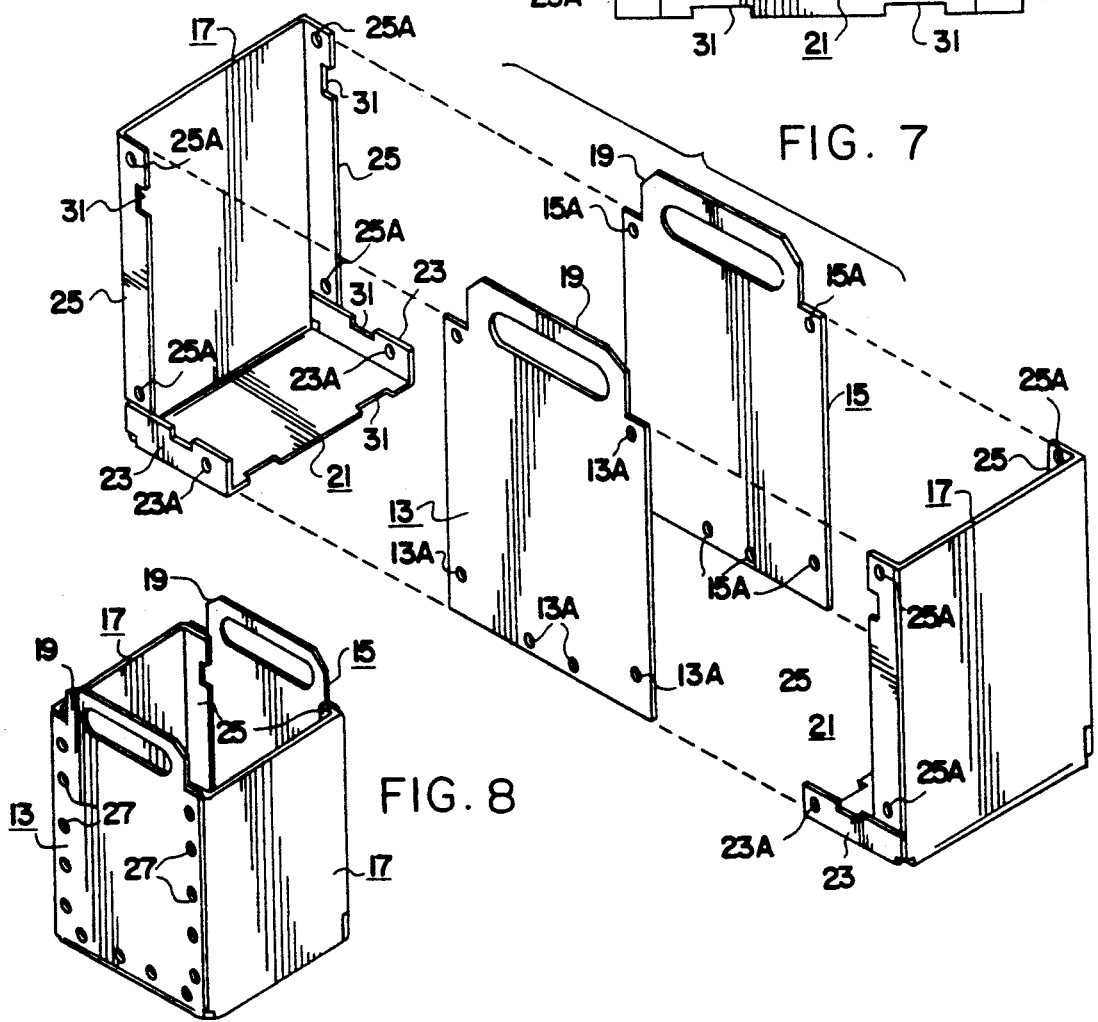

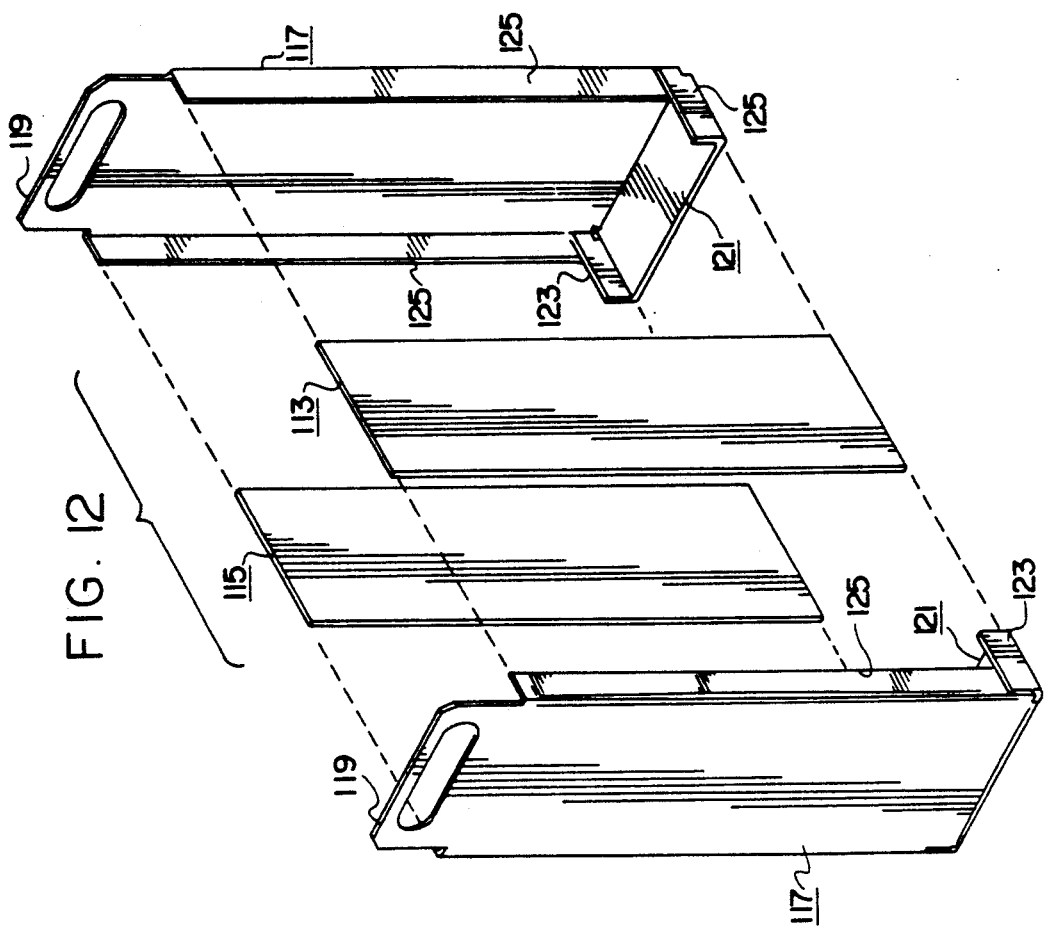
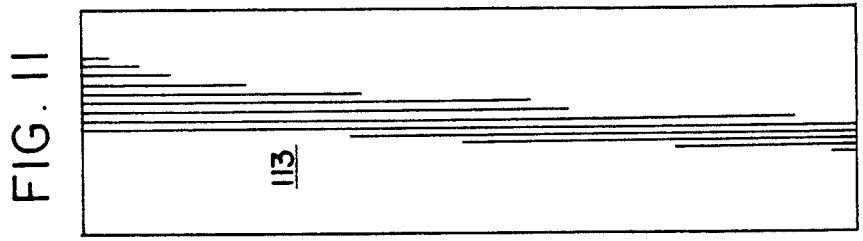
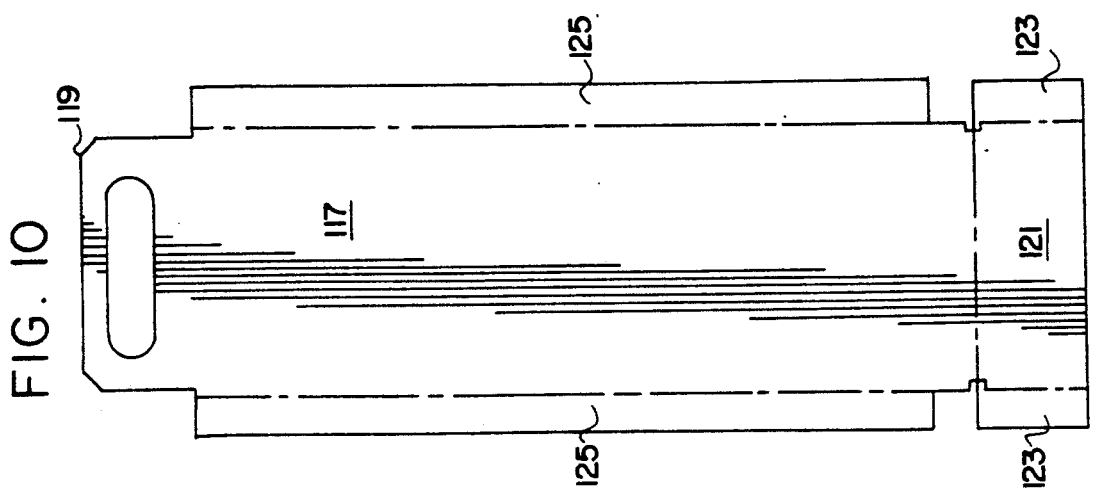

BATTERY TRAY DEVICE

FIELD OF THE INVENTION

The present invention relates to a tray for holding a product having a predetermined rectangular shape, and more particularly to a tray device for holding batteries which are placed at remote locations for extended periods of time.

BACKGROUND OF THE INVENTION

For a long time, stand-by or emergency power has been used by the railroad industry to operate signal systems, switch systems and the like. These systems include the appropriate control equipment along with a bank of batteries that are usually stored in a shed or other small structure. These batteries are stationary as distinguished from batteries for example that are used in lift trucks. The battery remains stationary for its useful life, which may be seven years or more.

Historically, these batteries have been contained in trays which are fabricated from relatively heavy metal such as steel. Typically, five pieces comprising the bottom and the four sides welded at every juncture to form the box. The welding is traditionally along all of the seams or junctures and such welding is of course difficult to do precisely. Since the batteries themselves are heavy, it is necessary to have seams which do not come apart. Additionally, the batteries have from three to five psig internal pressure which must be contained over the life of the battery, particularly in the later years as pressure may increase. The batteries are sealed, maintenance free batteries using gelled electrolytes, connected either in series or in parallel.

In the conventional manner of manufacturing the trays for holding these batteries, it has been found that welding markedly changes the shape of the tray. It is desirable to have the trays uniformly fit a predetermined rectangular shape which is optimally suited for a particular size battery. Recent efforts to use rechargeable batteries have been made, using solar panels to generate a steady electrical charge which is regulated by appropriate control electronics. This raises additional concern for build up of pressure in the battery since these batteries are completely unattended and it is more than ever important that the trays holding the batteries will not fail.

As systems become more complicated and extensive, increasingly performing more functions, more power is required. Batteries are stacked on pallets in these remote unattended locations, sometimes with sixty or seventy batteries of the same size all hooked together. The stacks of batteries reach 10 to 12 feet in height. This load places severe stress loads on the battery tray or container, and failure has occurred along seam welds of those conventional tray devices described above. Failure of the tray may even result in crushed batteries and expensive repair, not to mention interruption in reliability of the backup emergency power supply system.

One additional difficulty with prior art tray devices is the need for significant amount of labor in the manufacture, not only for the long seam welding procedures but also for the extensive grinding that is required. The metal needs to be removed in order to permit the battery to fit within the predetermined rectangular space, and thus spurs and other irregularities are to be removed. When aesthetics require a smooth outer appearance grinding costs are even greater Since, the tray itself is often placed in specifically sized cavities in a larger system, rough edges, burrs, spurs and the like must be removed to enable a closer tolerance and fit, as well as to protect those who install and remove the trays from cuts and scratches. Further, typically these trays are finished with an sulfuric acid resistant paint which will only adhere effectively to smooth metallic surfaces. The welding technique utilized in the tray of the present invention obviates the need for grinding and other expensive operations to prepare the surface for the paint finish.

Recently, cable systems, telephone relay stations, and other communication industry components have begun using remote structures with reserve power in the same way the railroad industry has done. The tremendous expected growth of fibre optics systems will place an extremely large demand for such remote power systems. Various regional Bell operating companies which service local calls are developing more extensive units including what has been termed a universal enclosure for remote terminal sites. Space considerations and placement of the battery is more important now then ever before.

Accordingly, it is an object of the present invention to provide tray devices for long term storage of batteries.

Another object of the present invention is to provide a tray device which has more uniform conformity to a predetermined rectangular size or shape, when that predetermined size or shape is to be filled with another object, such as a battery.

Yet another object of the present invention is to provide a tray device which does not require a substantial amount of post welding grinding to remove rough edges, burrs, spurs and the like.

It is a specific object of the present invention to provide a tray device which maintains structural integrity while requiring the use of less material and less labor in its manufacture.

Yet another objection of the present invention is to provide a tray device which conforms to a rectangular shape and which eliminates some welding steps.

Other objects will appear here and after.

SUMMARY OF THE INVENTION

It has now been discovered that the above and other objects of the present invention may be accomplished in the following manner. Specifically, the invention comprises a tray device having a predetermined rectangular shape.

The device comprises a front panel, a rear panel, a pair of side panels and first and second bottom panels which form the predetermined rectangular shape. The bottom panels have bottom flanges and the side flanges each have side panels which are formed transverse to the respective panels to which they are attached to form parallel planer contact regions for contact with the front and rear panels. The front and rear panels are spot welded to fixedly attach the flanges to the front and rear panels without substantially altering the predetermined rectangular shape.

The front and rear panels may conform to the exterior surfaces of the flanges or to the interior surfaces of the flanges depending upon the particular rectangular shape which is selected. Handle means may be provided on either set of front and rear panels or the side panels as desired. Preferably, the side panel flanges have sufficient spacing from the bottom panel flanges to permit location of all of the flanges in a plane parallel to the front panel or the rear panel with which they are associated.

The tray device of the present invention includes a plurality of mating detent means at the point of planar contact between the flanges and the front and rear panels to which they are attached to align the panels properly for the spot welding finish without the need for utilizing cumbersome and expensive jigs and fixtures. Slot means may also be provided for locating the device during manufacture thereof. The slot means would be formed in the periphery of at least two of the flanges.

BRIEF DESCRIPTION OF THE DRAWINGS

These and other objects of the present invention and the various features and details of the operation and construction thereof are hereinafter more fully set forth with reference to the accompanying drawings, where:

FIG. 1 is an exploded isometric view illustrating a steel battery tray useful for the protective containment and support in a predetermined rectangular space of various objects such as batteries, with a battery being shown removed from the tray and illustrated in dot and dash lines;

FIG. 2 is an enlarged elevational view of the device shown in FIG. 1;

FIG. 3 is a side elevational view of the device shown in FIG. 1;

FIG. 4 is a plan view of the device of FIG. 3;

FIG. 5 is a plan view showing development of the front or rear panel of the device shown in FIG. 1;

FIG. 6 is a plan view showing development of a side and bottom panel and the associated flanges;

FIG. 7 is an exploded isometric view showing the various components spaced from one another prior to being assembled and welded;

FIG. 8 is an isometric view illustrating different embodiments of the device shown in FIGS. 1 through 4;

FIG. 9 is an additional embodiment illustrating a device having different proportions from that shown in FIGS. 1 through 8;

FIG. 10 is a plan view showing a development for the front or rear panel and its associated bottom panel and flanges for the device shown in FIG. 9;

FIG. 11 is a plan view showing the development of the side panel for the device shown in FIG. 9; and FIG. 12 is an exploded isometric view showing the components of the device shown in FIG. 9 prior to assembly and welding.

DETAILED DESCRIPTION OF THE PREFERRED EMBODIMENT

As shown in the drawings, a tray device shown generally by the reference numeral 10 has a predetermined rectangular shape which is sized to fit a battery 11 or other object having a definite size and which is to be contained in the tray device for a period of time.

The tray device itself includes a front panel 13 and a back panel 15 and two side panels 17. In this embodiment, front panel 13 and rear panel 15 have handles 19 so that the loaded tray can be moved to its place of intended use. A similar device is shown in FIG. 9, wherein the handles 119 form part of the side panel 117, rather then the front panel 113 and rear panel 115.

Side panels 17 include bottom panels 21 shown in FIG. 4, and a plurality of flanges. Specifically, bottom panels 21 include bottom flanges 23 while side panels 17 include side flanges 25. As is shown in FIG. 2 side flange 25 has sufficient space from bottom flange 23 to permit location of all of the flanges in the plane of the front panel 13. In FIG. 3, both front panel 13 and rear panel 15 have side flanges 25 and bottom flanges 23 in the same plane. This insures that the predetermined rectangular shape will be maintained since all of the flanges and panels to which they are attached are in the same plane. Bottom flanges 23 and side flanges 25 are attached to front panel 13 and rear panel 15 by spot welds 27. It can be appreciated that spot welding subjects the tray device to substantially less heat distortion than would seam welding of rectangular plates to form the tray.

Turning now to FIGS. 5 and 6, the individual panels of the device are illustrated as development views. Panel 13 with handle 19 are cut from an appropriate material such as steel. Various forming methods may be used, depending upon the specific material from which the panel is formed. For use in railroad applications of long term battery storage of seven (7) years or more, it has been found that steel is an appropriate construction material. One particular steel which has been found to be suitable is SAE 1010 12 gauge steel.

The end panel 17, shown in FIG. 6 includes a bottom panel 21 which is bent during assembly at fold line 29 to 90° from the bottom portion as illustrated in FIG. 7. Similarly, bottom panel 21 includes bottom flanges 23 which are also bent along fold lines 29 to be perpendicular to plane of bottom panel 23. Side flanges 25 are folded at right angles along fold lines 29 to complete formation of the combination side panel/bottom panel shown in FIG. 7.

The configuration of the side and end panels described above ensures that irrespective of small variations in the total width $W_t$ in the end and side panels and flanges prior to bending as shown in FIG. 6, the width $W_e$ of the end panel and width $W_b$ of the base panel are within controlled precise dimensions. The distance from the base of the notch 31 and bend line 29 are the same. In other words, the distance D between the base of aligned confronting notches 31 is constant. To this end, the tooling registration notches 31 used in conjunction with a so called "positive stop bending gauge" ensures formation of side and bottom panels of predetermined uniform width thereby eliminating the need for a spot welding jig or fixture which is expensive and cumbersome. The present inventions provides a simple and effective means for ensuring a constant overall width for the end and bottom panels for mass produced assemblies. In accordance with the present invention, there is provided a simple means for bending the developed piece shown in FIG. 6 to provide end and bottom panels of relatively constant uniform width irrespective of slight variation in the total overall width of the development shown in FIG. 6. This ensures a positive uniform fit for the battery to produce the highly desired slip fit between the battery and the tray. This arrangement obviates the need for shims.

In order to assure that a proper right angle rectangular shape is achieved, notches 32 are also formed in the panel, at the junction between bottom panel 21 and side panel 17. Similarly, side flange 25 does not extend to the junction between side panel 17 and end panel 21 so that both bottom flange 23 and side flange 25 can be in the same plane. Side flange 25 is spaced from the junction fold line 29a by a distance 33 which is at least as long as the width of bottom flange 23.

The tray of this invention is shown in FIG. 7 in an exploded isometric view prior to assembly and welding. When the side panels 17 are joined to front panel 13 and rear panel 15, the predetermined rectangular shape is achieved. Front panel 13 and rear panel 15 can be placed on the inside of bottom flange 23 and side flange 25, as shown in FIGS. 1 through 4, for example, and as previously discussed, or, alternatively, front panel 13 and rear panel 15 can be placed on the outside of flanges 23 and 25, as is illustrated in FIG. 8. Again, spot welds 27 provide a much simpler means for permanently affixing the sides to the front and rear panels using much less material and substantially less labor.

As best illustrated in FIG. 1, means is providing for aligning the front and rear panels so that they can be spot welded in the manner indicated without the need for jigs or fixtures. To this end, the side and bottom flanges 23 and 25 are provided with small detents 25A and 23A respectively which register with punched openings 13A and 15A in the front and rear panels 13 and 15. In this manner even unskilled workers can produce highly precision fitting parts and maintain the desired close tolerances repetitively without using expensive and cumbersome jigs and saving the set up time required. This increases production two fold.

Shown in FIGS. 10, 11 and 12 are the components of the tray shown in FIG. 9 with different proportions and with the handle 119 also attached to the side panel 117. Otherwise, bottom panel 121, side flanges 123 and side flange 125 all function in the same manner as previously described. The device fits together so that the front panel 113 and the rear panel 115 can be attached on the inside of flanges 123 and 125, as shown in FIG. 9. Alternatively, the front panel 113 and rear panel 115 can be attached on the outside of flanges 123 and 125, in the manner shown in, for example, FIG. 8.

Construction of the device of the present invention is simple and effective, and it is far superior to the prior art method of seam welding a plurality of plates to attempt to form a predetermined rectangular space. The panels are cut, stamped or otherwise formed into their predetermined shapes. The bottom panel and the side and bottom flanges are then bent at right angles to the panels to which they are attached forming the components shown for example in FIG. 7 or FIG. 12. These formed pieces are then put together, such as by placing them in a jig or clamping them until a series of spot welds can be made to permanently attach the panels to each other. The right angles or perpendicular relationships of the various panels are maintained since spot welding heat is more localized and angular relationships are less likely to be distorted by heat. Similarly, the grinding steps are much less difficult and require less labor as well.

The tray devices of the present invention have been found to be much less expensive to manufacture, both from a material stand point and from a time or labor stand point, and they have been more effective in maintaining a proper predetermined rectangular shape. This permits the adaption of the present invention to large production runs where a significant number of identical trays are manufactured with virtually a 100% acceptance rate.

The following summarizes the advantages of a tray made in accordance with the present invention. The present invention essentially eliminates the problems and short comings of electric arc welding which is characteristic of the prior art trays. Electric arc welding produces distortion of the parts which impacts on the precision of the compartment formed for the battery. Electric arc welding also requires expensive and time consuming finishing techniques to prepare the surfaces for paint as described above. Furthermore, it has been observed that electric arc welding produces welding flashes which are in the nature of small sharp projections which can puncture the battery and cause damage and other jagged edges which may present a risk of injury to the users. As described above, the present invention obviates and corrects the short comings in the prior art.

Even though a particular embodiment of the present invention has been illustrated and described herein, it is not intended to limit the invention and changes and modifications maybe made therein within the scope of the following claims.

What is claimed is:

1. A tray device having a predetermined rectangular shape comprising:
    a front panel, a rear panel and a pair of side panels, first and second bottom panels forming said predetermined rectangular shape;
    each said side panel having a respective bottom panel folded thereto to form a bottom for said predetermined rectangular shape;
    said bottom panels having bottom flanges and said side panel having side flanges, all of said flanges being folded transverse to the respective panels for parallel contact with said front and rear panels; and
    a plurality of spot welds fixedly attaching said flanges to said front and rear panels without substantially altering said predetermined rectangular shape.

2. The device of claim 1 wherein said side flanges have sufficient spacing from said bottom flanges to permit location of all of said flanges in a plane parallel to said front and rear panels.

3. The device of claim 1 wherein said front and rear panels conform to the exterior surfaces of said flanges.

4. The device of claim 1 wherein said front and rear panels conform to the interior surfaces of said flanges.

5. The device of claim 1 wherein said front and rear panels or said side panels further include handle means for lifting said device.

6. The device of claim 1 which further includes a plurality of mating detent means for preventing relative movement between said front and rear panels and said flanges.

7. A tray device having a predetermined rectangular shape for holding a battery conforming to said predetermined rectangular shape comprising:
    a front panel, a rear panel and a pair of side panels first and second bottom panels forming said predetermined rectangular shape;
    each said side panel having a respective bottom panel folded thereto to form a bottom for said predetermined rectangular shape;
    said bottom panels having bottom flanges and said side panels each having side flanges all of said flanges being folded at right angles to the respective panels to provide parallel contact with said front and rear panels, said side flanges having sufficient space from said bottom flanges to permit location of all of said flanges in said plane of contact with said front and rear panels; and
    a plurality of spot welds fixedly attaching said flanges to said front and rear panels without substantially altering said predetermined rectangular shape.

8. The device of claim 7 wherein said front and rear panels conform to the exterior surface of said flanges.

9. The device of claim 7 wherein said front and rear panels conform to the interior surface of said flanges.

10. The device of claim 7 wherein either said front and rear panels or said side panels further include handle means for lifting said device.

11. The device of claim 7 which further includes a plurality of mating detent means for prevent relative movement of front and rear panels with respect to said flanges.

12. The device of claim 7 which further includes slot means for locating said device during manufacture thereof, said slot means being formed in the periphery of at least two of said flanges and panels.

13. A tray device as claimed in claim 1 including detents on said flanges engaging in punched openings in said front and rear panels to locate the elements relating to one another and provide resistance to shear.

14. A tray device as claimed in claim 1 including means defining cutouts (32) at the juncture of said side panels and bottom panels.

* * * * *